June 18, 1929.　　　　E. J. HENLE　　　　1,717,560

STAND FOR ARTICLES

Filed Feb. 23, 1924

Inventor
Edward J. Henle
By　Geo. A. Pitts
Attorney

Patented June 18, 1929.

1,717,560

UNITED STATES PATENT OFFICE.

EDWARD J. HENLE, OF CLEVELAND, OHIO.

STAND FOR ARTICLES.

Application filed February 23, 1924. Serial No. 694,640.

This invention relates to a stand for supporting annular or other shaped bodies, for example automobile tires.

One object of the invention is to provide an improved stand of this character comprising relatively few parts which may be easily constructed and assembled.

Another object of the invention is to provide an improved stand of this character, the elements of which are so connected that they may accommodate themselves to different sized tires to support the same without being strained or broken.

Other objects of the invention will be apparent to those skilled in the art to which my invention relates from the following description taken in connection with the accompanying drawings, wherein Fig. 1 is a front elevation of a tire stand embodying my invention and a tire supported thereby.

Figure 1:
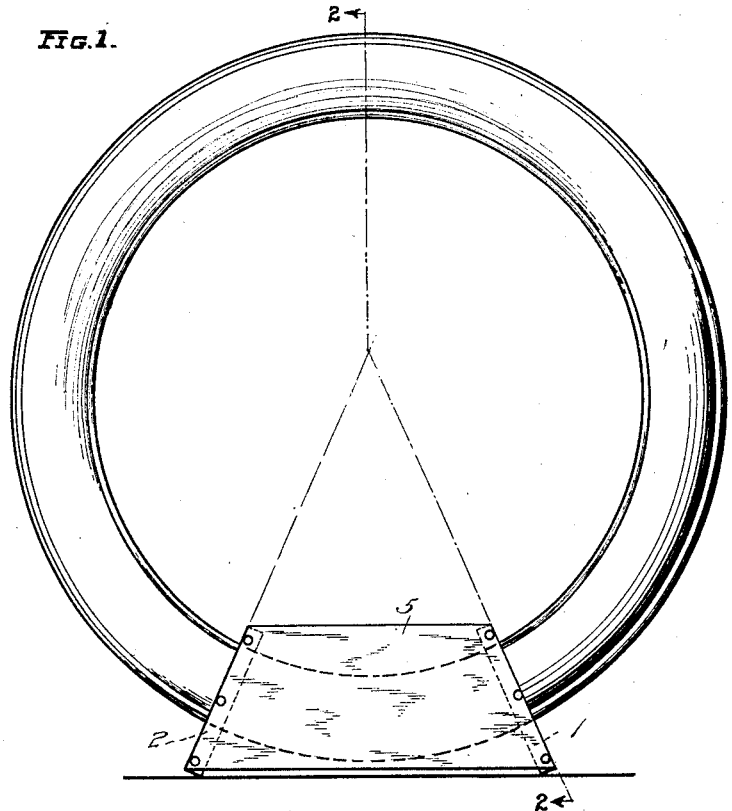

In the drawings, 1, 1, and 2, 2, indicate pairs of plates supported in co-operative relation to support a body or article. Due to the fact that the stand, in the preferred embodiment of the invention, is to be utilized for supporting an annular shaped body or article, such as a tire for a vehicle wheel, the pairs of plates 1, 1, 2, 2, are disposed transversely of the tire and at angles to each other, preferably on radii of the article to be supported. To permit the use of the stand for articles of different diameters, I dispose the plates 1, 1, 2, 2, on radii struck from the center of the average sized article to be supported, which is a tire of 34 inch diameter and to permit the use of the stand for supporting a tire of smaller diameter—such as shown in the drawings—and a tire of greater diameter, I pivot the lower ends of the plates of each pair to a resilient connector 3, which permits them to swing about varying pivotal points so that each pair of plates may be separated relative to each other first to receive and then to yieldingly engage the side walls of tires of varying sizes to support the latter in upright position. The connector 3 normally tends to swing the upper ends of the plates, 1, 1, 2, 2, together, to cause them to yieldingly clamp the sides of a tire. This construction permits the plates to engage tires of different sizes in cross section.

4, 5, indicate a pair of side members, each connected at its opposite ends to the corresponding plates 1, 2, and serving to space the pairs of plates relative to each other and to support them at the desired angles on the radii already referred to. The opposite ends of the side members are preferably cut on lines coincident with the radii desired, so that by securing the plates 1, 1, 2, 2, to the inner faces of the side members adjacent their ends, the plates will be disposed on the desired angles or radii.

Figure 2:
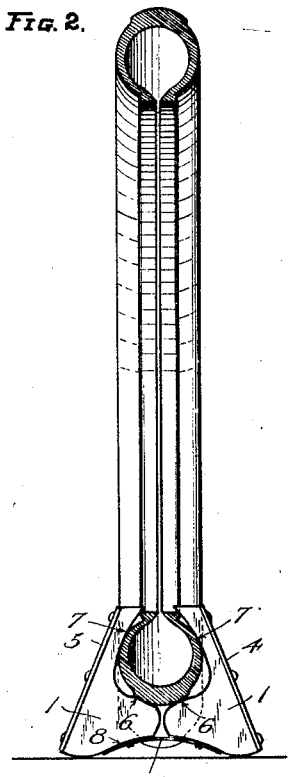
Fig. 2 is a section on the line 2—2 of Fig. 1.
Figure 4:
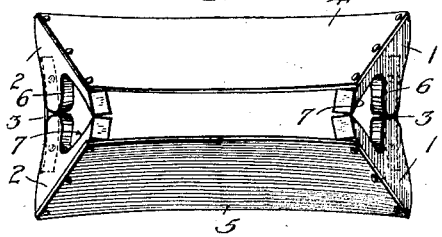
Fig. 4 is a plan view of the stand.

Each plate, 1, 1, 2, 2, is cut away on its inner edge to form a bottom wall 6 and a side wall 7, which walls co-operate with similar walls on the other plate of the pair to form a pocket for the tire. As will be understood from Figs. 2 and 3, the tire engages the bottom walls 6, 6, of the plates so that its weight tends to swing the upper ends of the plates together. Accordingly, it will be seen that the weight of the tire is utilized to supplement the spring action of the connectors 3 to cause a clamping action of the upper ends of the plates against the sides of the tire and thus maintain it in upright position.

Figure 3:
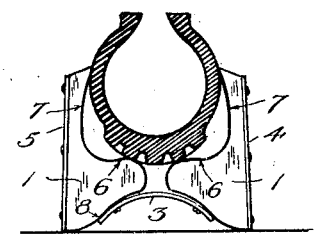
Fig. 3 is a fragmentary section similar to Fig. 2, but showing the stand supporting a different sized tire.

As shown in Fig. 3, the plates have relatively wide lower ends, this being for the purpose of forming relatively long bottom walls 6 and also to space the floor engaging edges of the plates beyond the opposite sides of the tire. By preference, the inner portions of the lower edges of the plates are cut-away as shown at 8, so that the plates engage the floor only at their outer edges. The outer side edges of the plates may be inclined inwardly, this arrangement serving to reduce the weight of the stand and also supporting the side members 4, 5, at an angle to reflect light for display purposes and to provide a display surface which is substantially at right angles to the line of vision.

Figure 5:
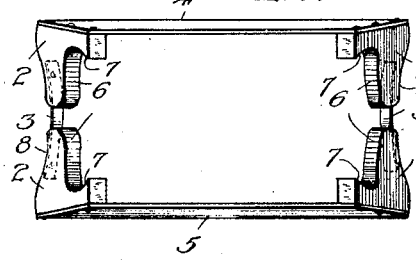
Fig. 5 is a plan view of the stand with the elements thereof separated to receive a tire.
Figure 6:
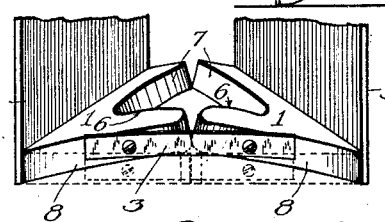
Fig. 6 is a fragmentary bottom view of the stand.

The connector 3 is preferably disposed below and connected to the lower edges of each pair of plates. Each connector 3 preferably comprises a strip of resilient metal connected at its opposite ends to the adjacent plates by screws or other devices which form pivots between the ends of the strip and the plates. Due to the fact that the connecting strip is formed of resilient material, it allows the plates of each pair to be moved relative to each other, so that they may be separated to receive tires (see Fig. 5) of different sizes in diameter and cross section, as already described. By connecting each pair of plates together by a flexible or resilient plate or strip 3, the plates may be moved about different pivotal points dependent upon the size of the tire to be received between them and supported. Due to the fact that there is a pivot connection between the ends of each connecting strip and the plates 1, 1, 2, 2, the latter will swing about these pivots relative to each other and adjust themselves to the proper angle as they engage the sides of the tire, dependent upon its size, so that strains on any of the parts of the stand are eliminated. This arrangement permits the side members 4, 5, to be formed from relatively thin material without danger of their being distorted or bent.

From the foregoing description it will be seen that I have provided a stand formed from few parts, which are capable of being readily made and assembled. Since the tire engaging plates are similar in construction, they can be readily made in large numbers. It will be seen also that the stand is so constructed that the plates which engage the tire to support it are so connected together that they may readily accommodate themselves to tires of different sizes in cross section and diameter without danger of straining or stressing the parts of the stand, thereby insuring strength and durability in its use.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. An article of the class described, comprising pairs of supporting plates having cut-aways formed in the upper portions of their opposing walls arranged to form a recess for a body to be supported, and a resilient member pivotally connected at its opposite ends to the plates of each pair and serving to swingably connect said plates together.

2. An article of the class described, comprising pairs of supporting plates having cut-aways formed in the upper portions of their opposing walls arranged to form a recess for an annular body to be supported, said members connecting the pairs of plates together in spaced relation and disposed substantially on the radii of the bodies to be supported, and means connecting the members of each pair of plates together, said means comprising a spring strip positioned along the lower face of each pair of plates and pivot connections between the strip and each plate, whereby the plates may accommodate themselves to different sized bodies.

3. A stand for an article including pairs of supporting plates oppositely recessed to support the article, a spring member connecting the members of each pair of plates, said spring member disposed along the lower face of each plate, means to pivotally secure said spring member to each plate, and side members spacing the pairs of plates.

4. In a tire holder, pairs of supporting plates, each comprising two members having a recess to receive a body to be supported, a flat spring connecting the members of each pair; said spring being pivotally connected to each member and means connecting the like members of said pairs.

In testimony whereof, I have hereunto subscribed my name.

EDWARD J. HENLE.